United States Patent
Ferlitsch

(10) Patent No.: US 8,237,951 B2
(45) Date of Patent: Aug. 7, 2012

(54) INTERMEDIATE STAGE EMULATION OF FIRMWARE ON CONNECTED HOST

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 954 days.

(21) Appl. No.: 11/127,626

(22) Filed: May 11, 2005

(65) Prior Publication Data

US 2006/0256366 A1    Nov. 16, 2006

(51) Int. Cl.
*G06F 3/12* (2006.01)

(52) U.S. Cl. ............ 358/1.15; 358/1.13; 358/1.14; 717/168; 717/174

(58) Field of Classification Search .......... 358/1.15, 358/1.13, 1.14; 717/168, 174
See application file for complete search history.

(56) References Cited

U.S. PATENT DOCUMENTS

| | | | | |
|---|---|---|---|---|
| 5,327,526 A * | 7/1994 | Nomura et al. | ............ | 358/1.16 |
| 5,467,410 A * | 11/1995 | Bloomberg | ............ | 382/100 |
| 5,550,614 A * | 8/1996 | Motoyama | ............ | 399/18 |
| 5,642,473 A * | 6/1997 | Klotz, Jr. | ............ | 358/1.18 |
| 5,970,224 A * | 10/1999 | Salgado et al. | ............ | 358/1.16 |
| 6,233,057 B1 * | 5/2001 | Ota | ............ | 358/1.13 |
| 6,501,556 B1 * | 12/2002 | Nishii | ............ | 358/1.12 |
| 6,622,246 B1 * | 9/2003 | Biondi | ............ | 713/100 |
| 6,668,374 B1 | 12/2003 | Sten et al. | | |
| 6,813,038 B1 * | 11/2004 | Kadowaki | ............ | 358/1.18 |
| 6,816,273 B1 * | 11/2004 | Kuga et al. | ............ | 358/1.15 |
| 7,142,321 B2 * | 11/2006 | Tomita et al. | ............ | 358/1.15 |
| 7,312,882 B2 * | 12/2007 | Hino et al. | ............ | 358/1.13 |
| 7,359,083 B2 * | 4/2008 | Salgado | ............ | 358/1.18 |
| 2002/0018681 A1 | 2/2002 | Kageyama | | |
| 2002/0118387 A1 * | 8/2002 | Patton | ............ | 358/1.15 |
| 2003/0023961 A1 | 1/2003 | Barsness et al. | | |
| 2003/0023962 A1 | 1/2003 | Erickson et al. | | |
| 2003/0043399 A1 | 3/2003 | Johnston et al. | | |
| 2003/0074659 A1 | 4/2003 | Lousoun et al. | | |
| 2003/0217357 A1 | 11/2003 | Parry | | |
| 2004/0010576 A1 * | 1/2004 | Hyndman et al. | ............ | 709/223 |
| 2004/0068548 A1 * | 4/2004 | Sugita | ............ | 709/208 |
| 2004/0120001 A1 * | 6/2004 | Boldon | ............ | 358/1.15 |
| 2004/0120004 A1 * | 6/2004 | Okamoto et al. | ............ | 358/1.15 |
| 2005/0010576 A1 * | 1/2005 | Ren et al. | ............ | 707/100 |
| 2005/0200903 A1 * | 9/2005 | Okubo | ............ | 358/3.24 |

FOREIGN PATENT DOCUMENTS

| | | |
|---|---|---|
| EP | 0964339 A2 | 12/1999 |
| EP | 964339 A2 * | 12/1999 |
| JP | 03-162983 | 7/1991 |
| JP | 08-016332 | 1/1996 |

(Continued)

*Primary Examiner* — Jacky X Zheng
(74) *Attorney, Agent, or Firm* — Michael F. Krieger; Adam D. Stevens; Kirton McConkie

(57) ABSTRACT

A firmware controller is configured to enhance or modify the processing capabilities of an imaging device by creating custom firmware for a particular imaging job. The firmware controller does so by dynamically linking firmware processing stages resident on the imaging device with additional firmware processing stages stored at a host device to form a sequence of firmware processing stages. The firmware controller then controls execution of the custom firmware by passing the output of each stage to the input of the next stage in the sequence. The firmware processing stages resident at the imaging device and the additional firmware processing stages stored at the host share a commonly defined interface for inputting data and/or control signals to and outputting data and/or control signals from each stage, which allows the firmware stages to be combined in a variety of different sequences.

26 Claims, 12 Drawing Sheets

FOREIGN PATENT DOCUMENTS

| | | |
|---|---|---|
| JP | 08-123635 | 5/1996 |
| JP | 10-207657 | 8/1998 |
| JP | 11-353146 | 12/1999 |
| JP | 2001-256008 | 9/2001 |
| JP | 2002-063098 | 2/2002 |

* cited by examiner

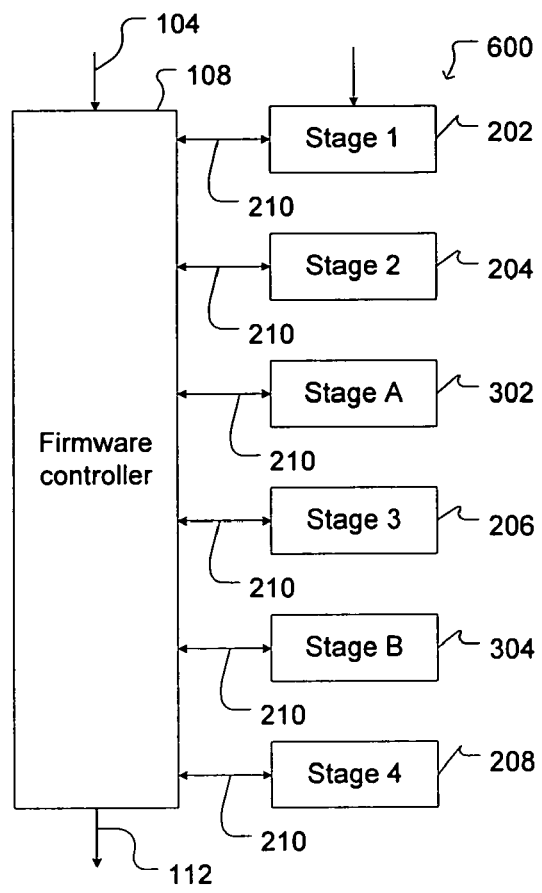
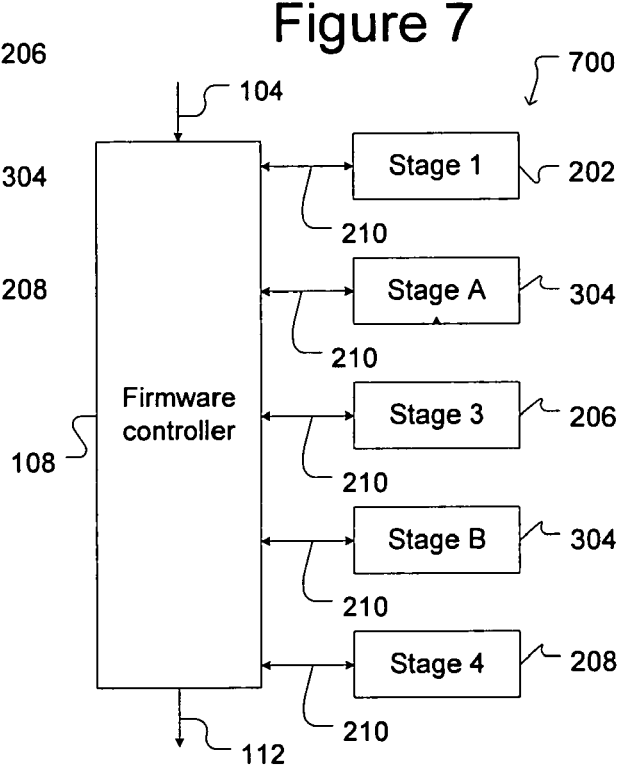

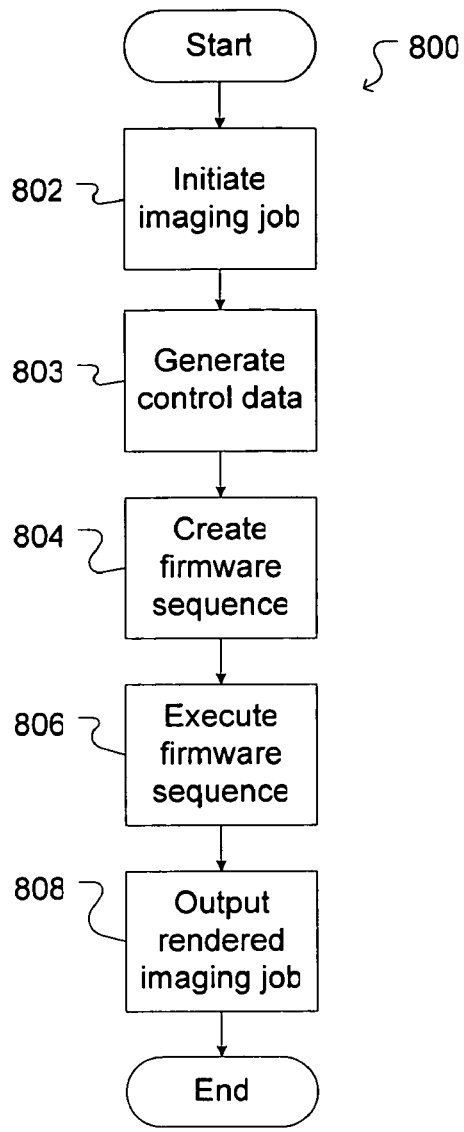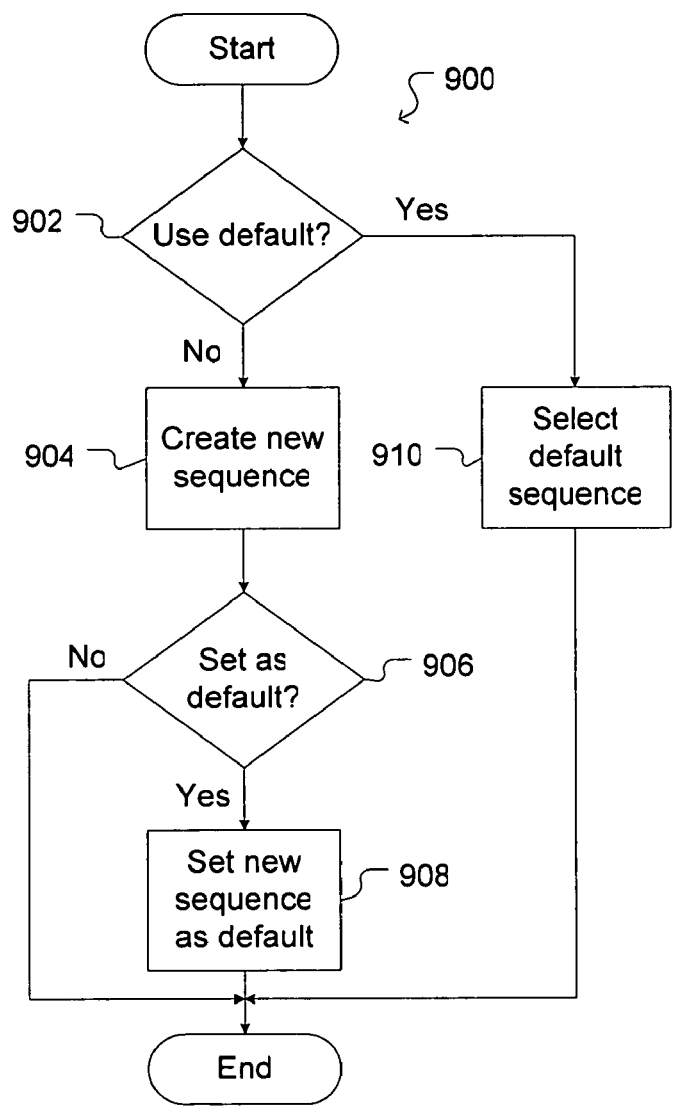

INTERMEDIATE STAGE EMULATION OF FIRMWARE ON CONNECTED HOST

BACKGROUND

FIG. 1 illustrates an exemplary simplified block diagram of a system for generating and processing an imaging job, which may include any job in which any type of data collection is to be processed. As shown in FIG. 1, an imaging job generator 10 generates an imaging job, which is output 12 to an imaging device 20. The imaging device 20 processes the image utilizing firmware 22 (which may include any combination of software and/or hardware) resident in the imaging device 20 and outputs the processed imaging job as rendered output 24.

Typically, to change the processing of the imaging job, the resident firmware 22 must be changed. Firmware 22 may be changed to fix errors (i.e., "bugs") in the firmware, improve processing, add features to the processing, etc. Typically, the resident firmware 22 on an imaging device 20 is changed by replacing the firmware with new firmware.

Generally speaking, however, replacing the firmware 22 in an imaging device 20 is not convenient. For example, thousands of models of a particular printer may be in use throughout the world, and replacing or updating the firmware 22 in all of the printers would require significant time, effort, and expense. Moreover, some firmware fixes or enhancements may be needed on only some of a particular imaging device. It should thus be apparent that methods and techniques for replacing or updating firmware are needed.

SUMMARY

In an exemplary embodiment of the invention, an imaging job is processed by firmware that comprises processing stages linked together to form a sequence of processing stages. A common interface for inputting data and/or control signals to and outputting data and/or control signals from each stage is utilized. Imaging data from the imaging job is processed by a first processing stage in the sequence, and the output of the first processing stage is passed as input to the second processing stage in the sequence. Output from the second processing stage is passed as input to the third processing stage, and output from the third processing stage is passed to the fourth processing stage. This method of passing output from a processing stage to the input of the next processing state in the sequence continues until all of the processing stages in the sequence have been executed.

A firmware controller is configured to enhance or modify the processing capabilities of an imaging device by creating custom firmware for a particular imaging job. The firmware controller does so by dynamically linking processing stages resident on the imaging device with additional processing stages stored at a host device. The firmware controller then controls execution of the custom firmware by passing the output of each stage to the input of the next stage in the sequence. In another exemplary embodiment, a firmware management application controls downloading of new firmware to the host device.

DESCRIPTION OF THE DRAWINGS

FIG. 6 illustrates another exemplary firmware sequence that may be created by the firmware controller of the system of FIG. 2.

FIG. 7 illustrates yet another exemplary firmware sequence that may be created by the firmware controller of the system of FIG. 2.

FIG. 8 illustrates exemplary operation of the imaging system of FIG. 2.

FIG. 9 illustrates an exemplary process for implementing step 804 of the process of FIG. 8.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein.

Figure 1:
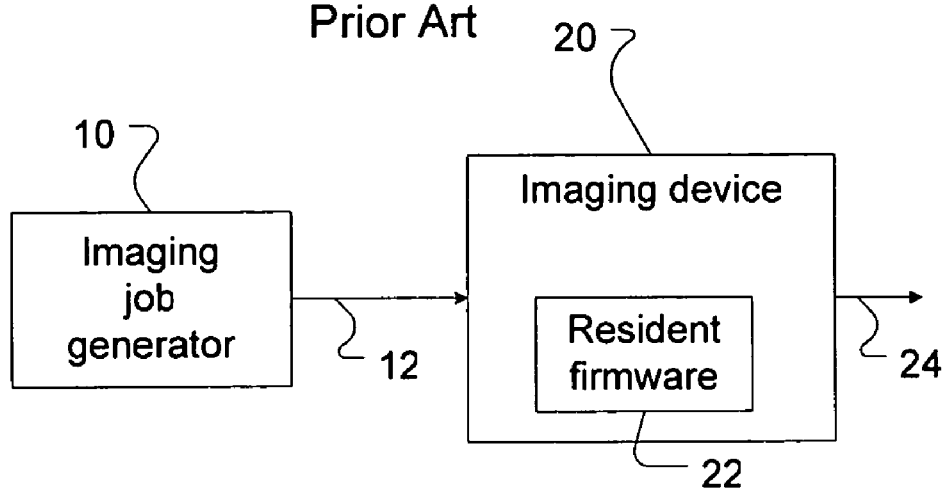
FIG. 1 illustrates a prior art system for generating and processing an imaging job.
Figure 2:
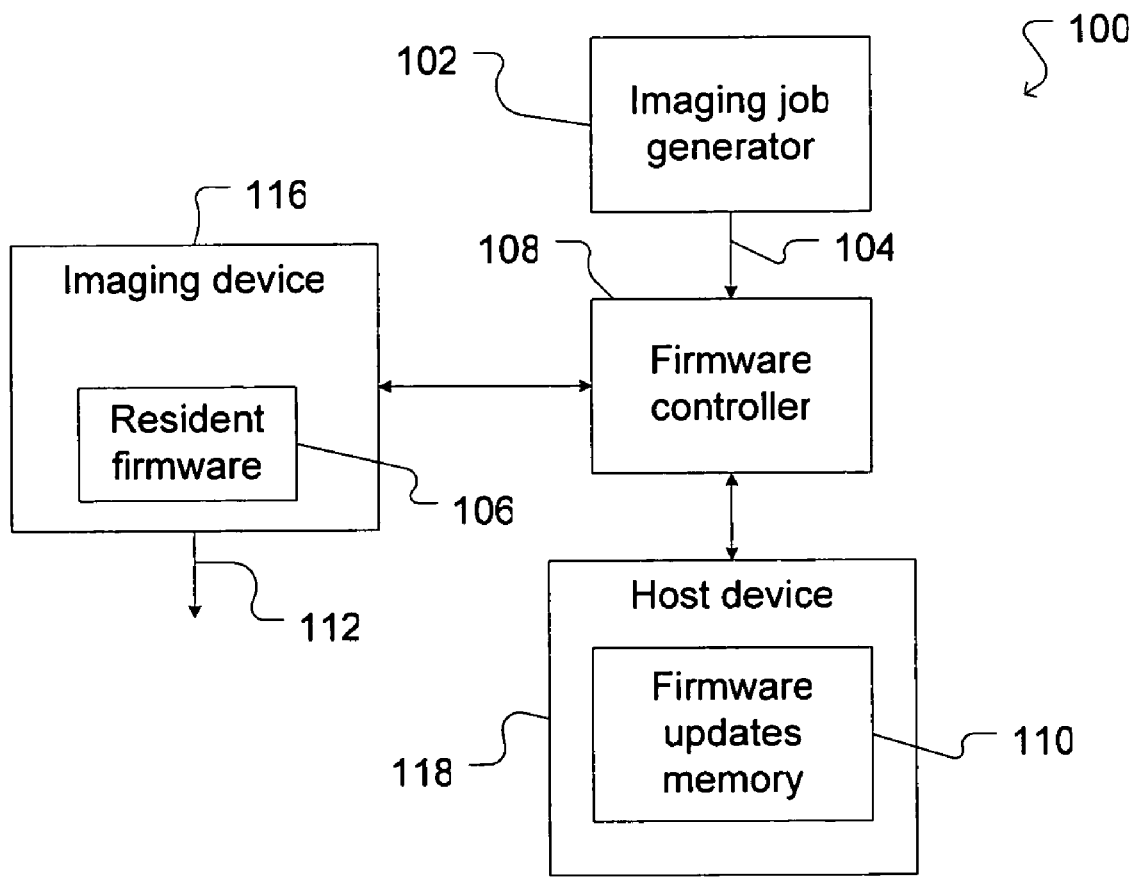
FIG. 2 illustrates an exemplary imaging system.

FIG. 2 illustrates a simplified block diagram of an exemplary imaging system 100 that has the ability to alter firmware processing of an imaging job. In the system 100, an imaging job generator 102 outputs 104 an imaging job that is to be processed by imaging device 116. Nonlimiting examples of imaging jobs include printing a document (e.g., stored in a word processing format or a page description language format) or other collection of digital data, copying a document, scanning a document or other physical entity, receiving a facsimile transmission, sending a facsimile transmission, retrieving a document or other collection of digital data from a computer server, sending a document or other collection of digital data to a computer server, processing data from an electronic whiteboard, processing data from a digital camera, outputting data to a digital projection system, processing data from a medical imaging system, writing data to or reading data from any type of digital memory device, etc. Nonlimiting examples of imaging device 116 include a printer, a copier, a scanner, a facsimile device, a document server, an image server, an electronic whiteboard, a digital camera, a digital projection system, a medical imaging device, and a digital memory device (e.g., a magnetic or optical disk drive). The imaging device 116 includes resident firmware 106 for processing the imaging job output 104 by the imaging job generator 102.

The system 100 of FIG. 2 also includes a firmware updates memory 110 located on a host device 118 and a firmware controller 108 configured to process the imaging job with a combination of the resident firmware 106 and firmware from the firmware updates memory 110.

Figure 3:
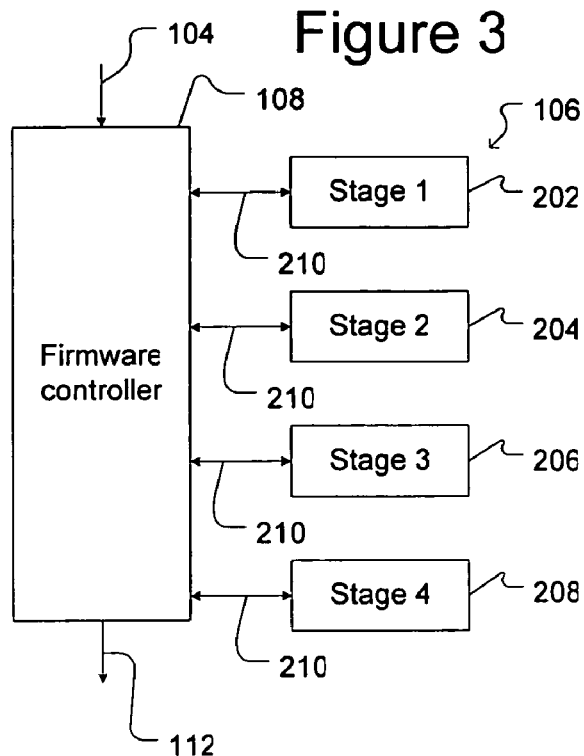
FIG. 3 illustrates an exemplary sequence of firmware stages that may be stored in the resident firmware in the imaging system of FIG. 2.

The resident firmware 106 on the imaging device 116 is organized into stages that are executed by the firmware controller 108 in sequence. FIG. 3 illustrates an example of resident firmware 106, which as shown, has four stages 202, 204, 206, 208, although fewer or more stages may be used in a given implementation. Each stage 202, 204, 206, 208 executes a portion of the firmware processing of the imaging device 116 for processing the imaging job output 104 by the imaging job generator 102. A defined interface 210 for passing data and optionally control signals into and out of stages 202, 204, 206, 208 is defined.

The firmware controller 108 controls execution of the exemplary resident firmware 106 shown in FIG. 3 as follows: the firmware controller 108 inputs to stage 1 202 imaging data output 104 by the imaging job generator 102 as part of an imaging job. Stage 1 202 processes the imaging data and outputs the results to the firmware controller 108, which inputs those results to stage 2 204. Stage 2 204 then processes its input and outputs the results to the firmware controller 108. The firmware controller than inputs the results from stage 2 204 to stage 3 206, which processes its input. Stage 3 206 then outputs the results of its processing to the firmware controller 108, which inputs those results to stage 4 208. Stage 4 208 then processes its input and outputs the results to the firmware controller 108. Because stage 4 208 is the last stage in the sequence shown in FIG. 3, the firmware controller outputs the results from stage 4 208 processing as the rendered output 112 of the imaging device 116.

The interface 210 may include predefined data types and formats for inputting data and optionally control signals into a firmware stage and for outputting processed data and optionally control signals from the firmware stage. As just one example, the defined interfaces 210 may be a C/C++ programming interface. For example, each firmware stage may be a C/C++ function or method, and the interface 210 may be a defined set of data and optionally control input to and output from the function or method. In such a case, the firmware controller 108 executes a sequence of firmware stages by sequentially calling the function or method corresponding to each stage while passing output from one stage as input to the next stage. In transferring the data output from one stage to the input of a next stage, the data may be copied from one stage to another or stored in a shared memory space. A firmware stage (not shown) may be configured to translate data into a format that is compatible with the interface 210, and such a stage may be included in a firmware sequence to translate data for other stages in the sequence that are not compatible with the standard interface 210. In that way, stages whose input and/or output is not compatible with interface 210 may be used in a firmware sequence.

The firmware updates memory 110 stores firmware stages that are generally similar to the firmware stages that compose the resident firmware 106. That is, the firmware stages in the firmware updates memory 106 operate with the same interface 210 as the firmware stages in the resident firmware 106. The firmware stages in the firmware updates memory 110 can thus be interleaved with or replace firmware stages in the resident firmware to alter the overall firmware processing of an imaging job output 104 by the imaging job generator 102.

Figure 4:
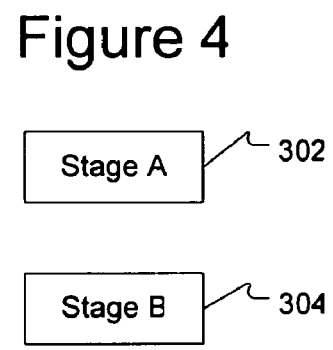
FIG. 4 illustrates exemplary firmware stages that may be stored in the firmware updates memory of the system of FIG. 2.

FIG. 4 illustrates an example of firmware updates memory 110, which as shown, includes two firmware stages: stage A 202 and stage B 204. Of course, the firmware updates memory 110 may include fewer or more firmware stages. Because firmware stages A 302 and B 304 in the firmware updates memory 110 utilize the same interface 210 as the firmware stages in the resident firmware 106, the firmware controller 108 can create firmware sequences for processing the imaging job output 104 by the imaging job generator that includes any combination of the stages in the resident firmware 106 and the stages in the firmware updates memory 110. It should be noted that the firmware updates memory 110, although shown in FIG. 2 disposed on a host device 118, may alternatively be located other than on a host device 118. In addition, one or more of the firmware sequences (e.g., 302, 304) may be downloaded temporarily or permanently to the firmware controller 108.

Figure 5:
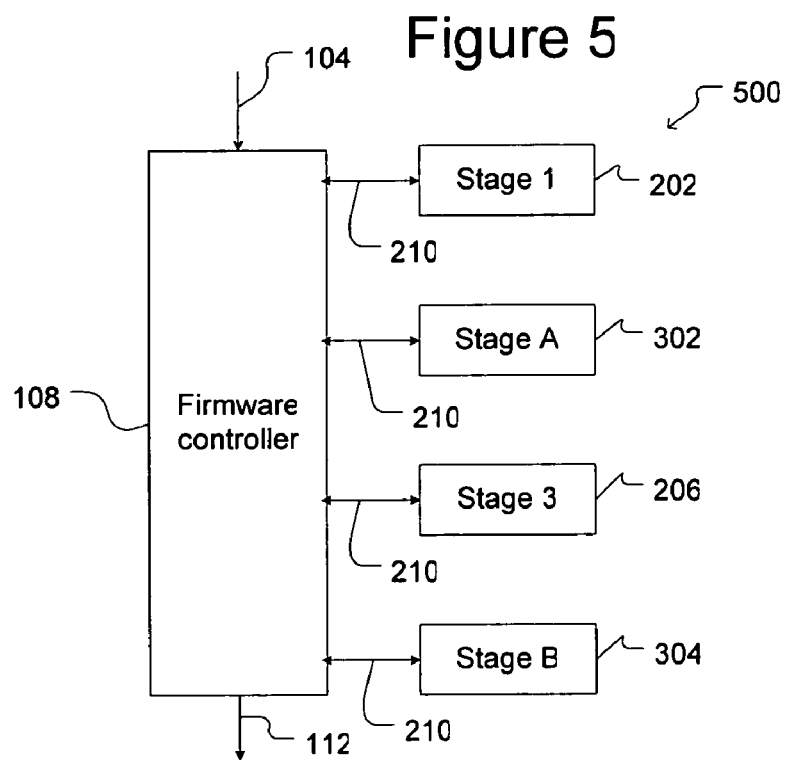
FIG. 5 illustrates an exemplary firmware sequence that may be created by the firmware controller of the system of FIG. 2.

FIGS. 5, 6, and 7 illustrate three nonlimiting examples of firmware sequences that can be created by the firmware controller 108 for processing an imaging job output 104 by the imaging job generator 102. In the exemplary firmware sequence 500 illustrated in FIG. 5, stage 2 204 and stage 4 208 in the resident firmware 106 are replaced by stage A 302 and stage B 304, respectively, from the firmware updates memory 110. In the exemplary firmware sequence 600 shown in FIG. 6, stage A 302 from the firmware updates memory 110 is interleaved between stage 2 204 and stage 3 206 of the resident firmware 106, and stage B 304 from the firmware updates memory 110 is interleaved between stage 3 206 and stage 4 208 of the resident firmware 106. In the exemplary firmware sequence 700 shown in FIG. 7, stage 2 204 in the resident firmware 106 is replaced by stage A 302 from the firmware updates memory 110, and stage B 304 from the firmware updates memory 110 is interleaved between stage 3 206 and stage 4 208 of the resident firmware 106. Many other combinations are possible. For example, the firmware controller 108 may reorder the sequence of execution of the stages (e.g., 202, 204, 206, 208) in the resident firmware 106 and/or delete stages (e.g., 202, 204, 206, 208) in the resident firmware 106 and thus create a modified sequence of firmware stages without utilizing stages (e.g., 302, 304) from the firmware update memory 110.

It should thus be apparent that the firmware controller 108 can use the stages in the firmware updates memory 110 to create a wide variety of firmware sequences for processing imaging jobs output 104 by the imaging job generator 102. Moreover, the stages in the firmware updates memory 110 can represent changes to the resident firmware 106 (e.g., a stage in the firmware updates memory 110 is intended to replace a stage in the resident firmware 106) or additional processing options added to the resident firmware 106 (e.g., a stage in the firmware updates memory 110 is intended to be interleaved with stages in the resident firmware 106).

FIG. 8 illustrates exemplary operation of the imaging system 100 of FIG. 2. At step 802, the imaging job generator 102 generates an imaging job. The imaging job will include at least imaging data to be processed by the imaging device 116. For example, if the imaging device 116 is a printer, the imaging job will include digital data to be printed. As another example, if the imaging device 116 is a copy machine, the imaging job will include data representing a scan of the document that is to be printed on copy paper. As yet another example, if the imaging device 116 is a facsimile machine, the imaging job may include data composing a received incoming transmission, which is to be processed to be printed or stored on a user's computer. Alternatively, the imaging job may include data representing a document that is to be transmitted by the facsimile machine.

At step 803, control data is generated. The control data defines processing parameters for the imaging job generated at step 802. For example, if the imaging device is a printer and the imaging job is a document stored in a page description language, the processing parameters may define a series of processing steps for translating the page description language into signals for driving the print engine of the printer. The control data generated at step 803 may also include data identifying particular processing options to be used in processing the imaging job. For example, the control data may include processing option codes that correspond to firmware sequences that can be created from the stages in the resident firmware 106 and the stages in the firmware updates memory 110 (e.g., firmware sequences 500, 600, and 700 in FIGS. 5, 6, and 7). As another alternative, the control data may include copies of one or more firmware stages from the firmware updates memory 110 that are to be used with or in place of the resident firmware 106 to process the imaging job generated at step 802.

The control data generated at step 803 may be generated by the imaging job generator 102, the firmware controller 108, another device (not shown), or a combination of the forgoing. Moreover, the control data may be generated automatically based on preset processing options or parameters. For example, if the imaging job generator 102 is a computer and the imaging job a document to be printed, the control data may be generated automatically by the computer based on the type of document that is to be printed and/or preset options or parameters regarding the document. As another alternative, the control data may be generated in response to selections by a user. For example, if the imaging job generator 102 is a copy machine, the copy machine may include a control panel that allows the user to select from a variety of copying options. In such a case, the control data generated at step 803 may be based on user selections.

At step 804, the firmware controller 108 creates a firmware sequence (i.e., a sequence of firmware stages) for processing the imaging job generated at step 802. FIG. 9 illustrates an exemplary process 900 for implementing step 804. At step 902, the firmware controller 108 determines whether to use a default firmware sequence to process the imaging job generated at step 802, and if so, selects the current default firmware sequence at step 910.

As mentioned above, the control data generated at step 803 may include processing directives or codes, and one such directive or code may identify the default firmware sequence for use in processing the imaging job. Alternatively, the absence of any directive or code regarding firmware processing of the imaging job may be interpreted at step 902 as a directive to use the default firmware sequence. Similarly, an unrecognized processing directive or code may be interpreted as a directive to use the default sequence.

The default firmware sequence may be the sequence in the resident firmware 106 (e.g., as shown in FIG. 3). Alternatively, the default firmware sequence may be another sequence (e.g., any of the sequences 500, 600, 700 shown in FIGS. 5, 6, and 7) that was previously set as the default firmware sequence.

If the firmware controller 108 determines at step 902 not to use the default firmware sequence, the process 900 branches to step 904, where the firmware controller 108 creates a firmware sequence for processing the imaging job generated at step 802. As mentioned above, the control data generated at step 803 may include processing directives or codes. At step 904, the firmware controller may create a firmware sequence that corresponds to such directives or codes. For example, the firmware controller may include digital storage space (not shown) in which is stored a table correlating processing codes with firmware sequences that can be created from the resident firmware 106 and the firmware updates memory 110. In such a case, the firmware controller 108 utilizes the table to translate a processing directive or code in the control data into a firmware sequence, which the firmware controller 108 then creates by linking stages from the resident firmware 106 and stages from the firmware updates memory 110 into a sequence, as discussed above with respect to FIGS. 3-7. Alternatively, the directive or code may identify a previously created sequence, which is then selected at step 904 as the sequence to use in processing the imaging job generated at step 802 of FIG. 8.

At step 906, the firmware controller 108 determines whether to set the new sequence created at step 904 as the default firmware sequence. Such a directive to set the new sequence as the default sequence may be included in the control data generated at step 803. If so, the firmware controller 108 sets the new sequence as the default sequence at step 908 (in which case, the new sequence will be the default sequence selected at step 910 in subsequent executions of process 900).

Figure 10:
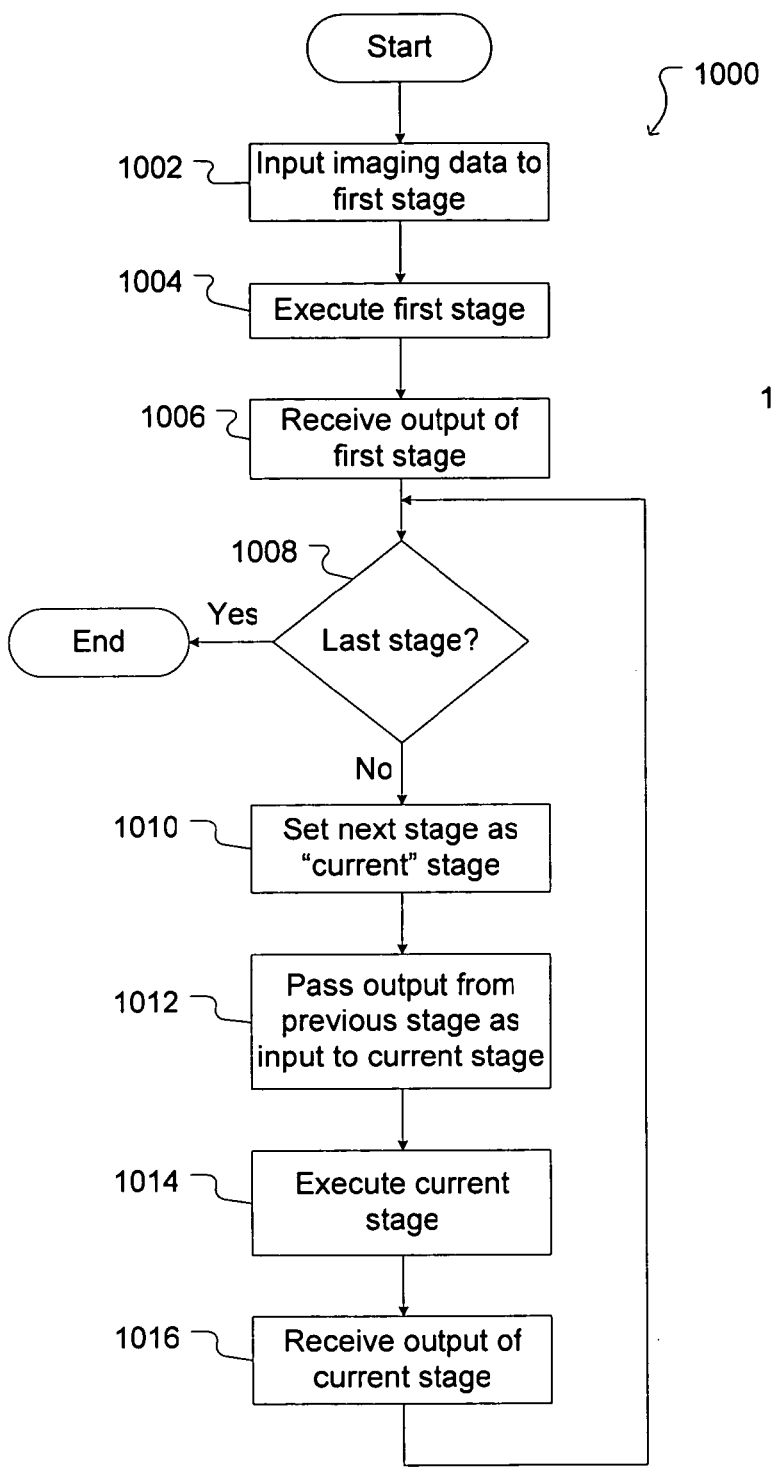
FIG. 10 illustrates an exemplary process for implementing step 806 of the process of FIG. 8.

Referring again to FIG. 8, at step 806, the firmware controller 108 processes the imaging job generated at step 802 by executing the firmware sequence created at step 804, which as discussed above, is either a default firmware sequence selected at step 910 of FIG. 9 or a firmware sequence created at step 904. FIG. 10 illustrates an exemplary process 1000 for implementing step 806 of FIG. 8.

At step 1002, the firmware controller 108 passes as input to the first stage in the firmware sequence created at step 804 of FIG. 8 the imaging data from the job created at step 802 of FIG. 8. At step 1004, the first stage in the firmware sequence processes its input data. At step 1006, the firmware controller 108 receives the output from the first stage.

At step 1008, the firmware controller 108 determines if all stages in the sequence have been executed, and if so, the process 1000 of FIG. 10 ends. Otherwise, the firmware controller 108 branches to step 1010, where the firmware controller 108 sets the next stage in the sequence as the "current" stage.

At step 1012, the firmware controller 108 passes as input to the "current" stage in the firmware sequence created at step 804 of FIG. 8 the output from the previously executed stage. At step 1014, the "current" stage executes (that is, processes its input data). At step 1016, the firmware controller 108 receives the output of the "current" stage, which is the result of processing by the "current" stage. The firmware controller 108 then repeats steps 1008, 1010, 1012, 1014, and 1016 until all of the stages in the firmware sequence created at step 804 of FIG. 8 are processed.

By way of example, the firmware controller 108 executes the exemplary firmware sequence 500 shown in FIG. 5 as follows: at step 1002, the firmware controller 108 passes the imaging data generated at step 802 of FIG. 8 as input to stage 1 202; at step 1004, stage 1 202 processes the imaging data; and at step 1006, the firmware controller 108 receives the output from stage 1 202. The firmware controller 108 then determines at step 1008 whether stage 1202 is the last stage in the firmware sequence 500. Because stage 1 202 is not the last stage in sequence 500, the firmware controller 108 proceeds to step 1010, where the stage A 302 in the sequence 500 is set as the "current" stage. Then, at step 1012, the firmware controller 108 passes the output from stage 1 202 (received by the firmware controller 108 at step 1006) as input to stage A 302;

stage A 302 processes its input data at step 1014; and the firmware controller 108 receives the output of stage A 302 processing at step 1016.

The firmware controller 108 then loops back to 1008, where the firmware controller 108 determines whether stage A 302 is the last stage in the firmware sequence 500. Because stage A 302 is not the last stage in sequence 500, the firmware controller 108 proceeds to step 1010, where the stage 3 206 in the sequence 500 is set as the "current" stage. Then, at step 1012, the firmware controller 108 passes the output from stage A 302 (received by the firmware controller 108 at step 1016) as input to stage 3 206; stage 3 206 processes its input data at step 1014; and the firmware controller 108 receives the output of stage 3 206 processing at step 1016.

The firmware controller 108 again loops back to 1008, where the firmware controller 108 determines whether stage 3 206 is the last stage in the firmware sequence 500. Because stage 3 206 is not the last stage in sequence 500, the firmware controller 108 proceeds to step 1010, where stage B 304 in the sequence 500 is set as the "current" stage. Then, at step 1012, the firmware controller 108 passes the output from stage 3 206 (received by the firmware controller 108 at step 1016) as input to stage B 304; stage B 304 processes its input data at step 1014; and the firmware controller 108 receives the output of stage B 304 processing at step 1016.

The firmware controller 108 again loops back to step 1008, where the firmware controller 108 determines whether stage B 304 is the last stage in the firmware sequence 500. Because stage B 304 is the last stage in sequence 500, the process 1000 of FIG. 10 ends.

Referring again to FIG. 8, after processing the imaging job generated at step 802 by executing at step 806 the firmware sequence created at step 804, the firmware controller 108 outputs the results of executing the firmware sequence (step 806) at step 808 as the rendered output of the imaging job, which output is identified as 112 in FIGS. 2, 3, 5, 6, and 7. Referring to the above-discussed example in which firmware sequence 500 of FIG. 5 is processed at step 806, the output of stage B 304 (received by the firmware controller 108 at step 1016 of FIG. 10), is output at step 808 as the rendered output of the imaging job generated at step 802.

The processing shown in FIGS. 8, 9, and 10 is exemplary. Alternative processing is, of course, possible. For example, rather than create a sequence at step 804 of FIG. 8 and then execute the sequence at step 806, the steps of creating and executing 804, 806 can, in essence, be combined such that a sequence of firmware stages is created and executed dynamically. For example, an initial stage may be identified at step 804 followed by execution of the stage at step 806. The identify of the second stage to be executed may depend on processing of the initial stage. Thereafter, the identity of a "next" stage to be executed may be determined from or depend on processing during execution of the preceding stage.

Figure 11:
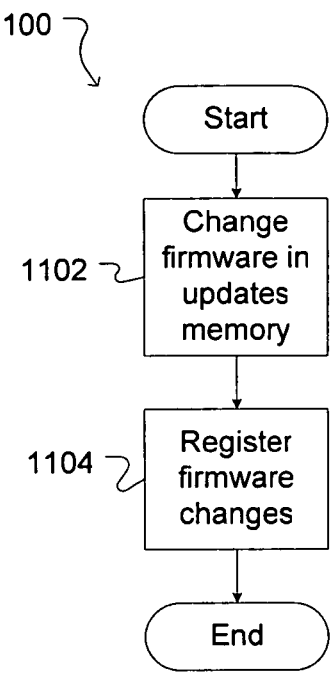
FIG. 11 illustrates an exemplary process for loading and registering firmware in the firmware updates memory of the system of FIG. 2.

It should be apparent that the firmware processing capabilities and options of the system 100 of FIG. 2 are readily altered or enhanced by adding or changing firmware in the firmware updates memory 110. FIG. 11 illustrates an exemplary process 1100 for changing firmware in the firmware updates memory 110. At step 1102, one or more firmware stages are added to or deleted from the firmware updates memory 110, which may consist of a digital memory device (e.g., a semiconductor memory device, a magnetic memory device, an optical memory device, etc.). Of course, new versions of one or more firmware stages may overwrite stages already stored in the firmware updates memory 110. At step 1104, information regarding the foregoing changes to the firmware stages in the firmware updates memory 110 is written to appropriate devices in the imaging system 100. For example, such information may be written to and stored at one or more of the imaging job generator 102, firmware controller 108, imaging device 116, or other device (not shown). For each firmware stage in the firmware updates memory 110, such information may include data identifying the stage, identifying processing capabilities of the stage, indicating how to link the stage to other stages to create a firmware sequence, etc. The information may also include menus or other display entities for displaying to a user new processing options made available by new firmware in the firmware updates memory 110.

Referring again to FIG. 2, the resident firmware 106 is preferably located on the imaging device, and the firmware updates memory 110 is preferably located on a separate host device 118. The imaging job generator 102 and the firmware controller 108 may be located on the imaging device 116, the host device 118, or another device (not shown), although the imaging job generator 102 and the firmware controller 108 need not be located on the same device. Alternatively, the imaging job generator 102 and the firmware controller 108 may be distributed across multiple such devices. The host device 118 may be any device suitable for storing firmware updates. For example, the host device 118 may be a client computer or a server computer on a computer network, or the host device 118 may be another imaging device or some other device.

FIGS. 12, 13, 14, and 15 illustrate examples of systems (generally similar to system 100) in which the host device 118 is a client device 1202, which is connected to the imaging device 116 via a communications link 1250, such as a computer network.

Figure 12:
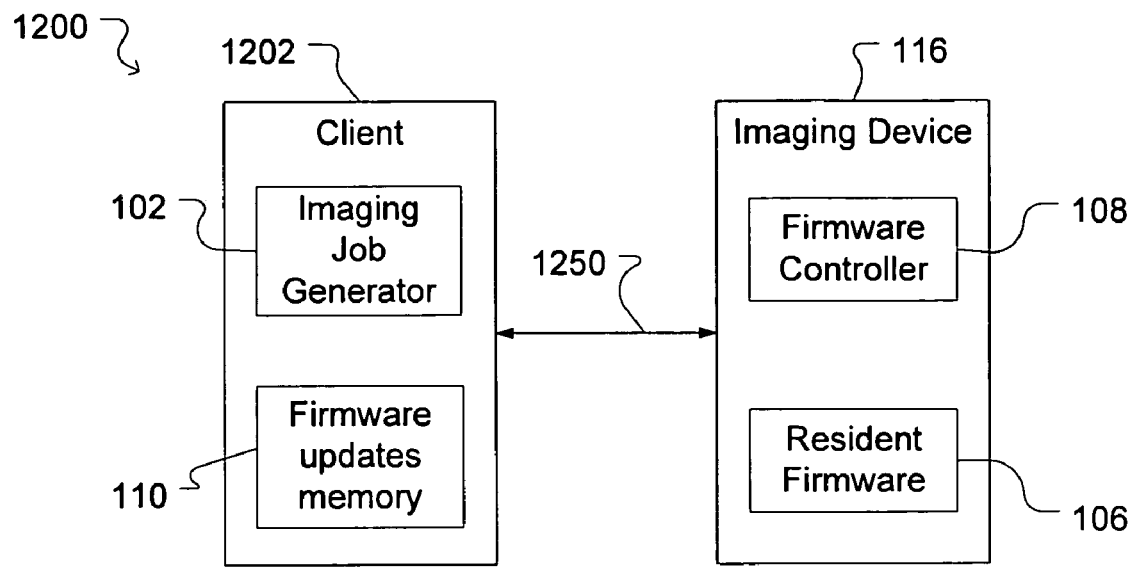
FIGS. 12-15 illustrate exemplary imaging systems in which the firmware updates memory is located on a client device.

In FIG. 12, the imaging job generator 102 is located on the client device 1202, which may be, for example, a client computer on a network. For example, the client device 1202 may be a client computer that generates a document to be printed, and the imaging device 116 may be a network printer. As another example, the client device 1202 may generate a document to be transmitted by a network facsimile machine, and the imaging device 116 may be the network facsimile machine.

The system 1200 of FIG. 12 may operate in accordance with process 800 of FIG. 8 as follows: per step 802 of FIG. 8, the imaging job generator 102 generates an imaging job at the client device 1202, and the imaging job generator 102 also generates control data at step 803. The imaging job and the control data are sent from the client device 1202 over communications link 1250 to the imaging device 116. The firmware controller 108 in the imaging device 116 then creates and executes a firmware sequence (and thereby processes the imaging job) as discussed above with respect to steps 804 and 806 of FIG. 8 (and FIGS. 9 and 10). In executing the firmware sequence at step 806, the firmware controller 108 executes stages from the firmware updates memory 110 by sending over communications link 1250 input to the stage, causing the stage to execute at the client device 1202, and receiving output from the stage over the communications link 1250 as described above with respect to FIG. 10. Alternatively, the control data sent via communications link 1250 to the imaging device 116 may include copies of the firmware stages from the firmware updates memory 110, which are then executed by the firmware controller 108 at the imaging device 116. The rendered output (step 808 of FIG. 8) is sent from the imaging device 116 via the communications link 1250 to the client device 1202.

Figure 13:
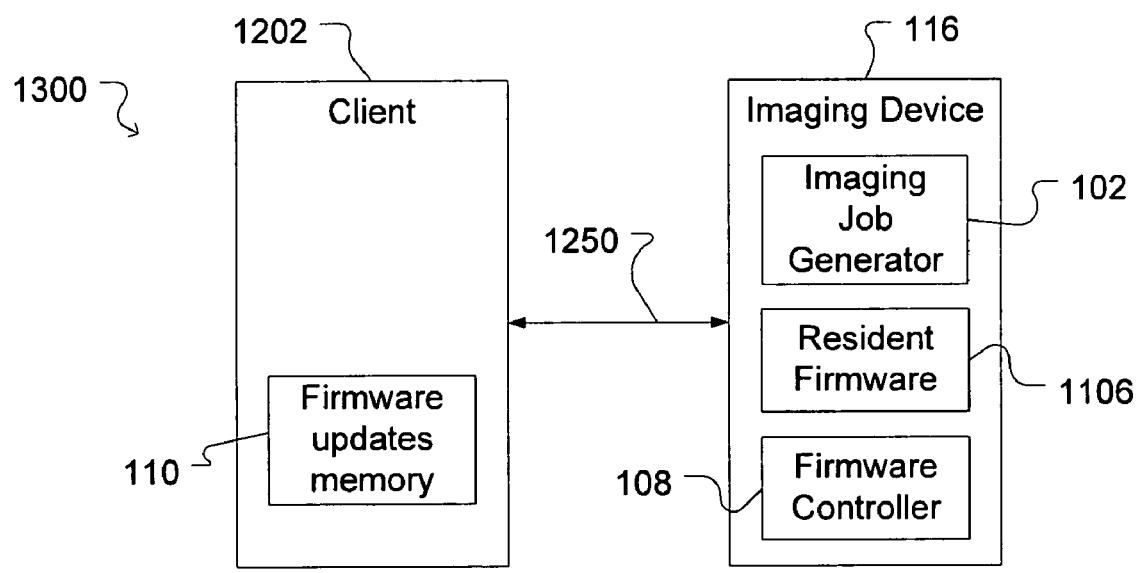

The exemplary system 1300 of FIG. 13 is generally similar to system 1200 of FIG. 12 except the imaging job generator 102 in system 1300 is located at the imaging device 116. Here, the imaging device 116 may be a scanner or a facsimile machine, and the client device 1202 may be a computer that is to receive data representing a document scanned by or received by facsimile transmission at imaging device 116.

In accordance with step 1104 of process 1100 shown in FIG. 11 and discussed above, firmware stages stored in the firmware updates memory 110 on the client device 1202 are registered with the imaging device 116. System 1300 may operate in accordance with process 800 of FIG. 8 as follows: at steps 802 and 803 of FIG. 8, the imaging job generator 102 generates an imaging job and control data. Because the firmware stages in the firmware updates memory 110 were registered with the imaging device 116, the control data may include processing options that require use of firmware stages from the firmware updates memory 110. At steps 804 and 806 of FIG. 8, the firmware controller 108 creates and executes a firmware sequence, as discussed above with respect to FIGS. 8, 9, and 10. Again, in executing the firmware sequence at step 806, the firmware controller 108 executes stages from the firmware updates memory 110 by sending over communications link 1250 input to the stage, causing the stage to execute at the client device 1202, and receiving output from the stage over the communications link 1250 as described above with respect to FIG. 10. Alternatively, copies of the firmware stages may be downloaded from the firmware updates memory 110 through the communications link 1250 to the imaging device 116, where they are executed by the firmware controller 108 as part of step 806. The rendered output (step 808 of FIG. 8) is sent from the imaging device 116 via the communications link 1250 to the client device 1202.

Figure 14:
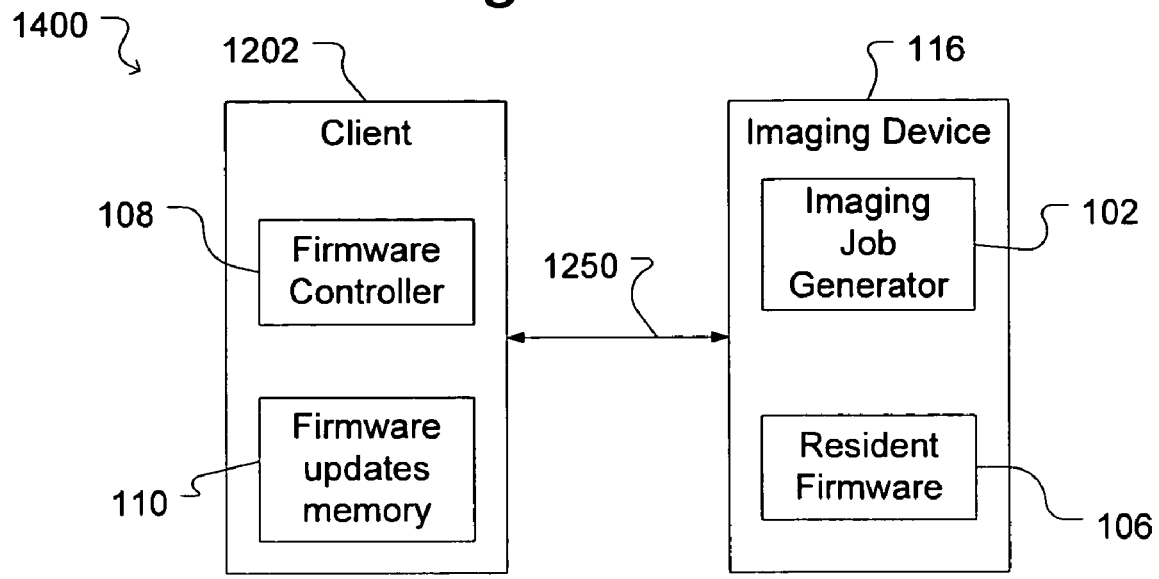

The exemplary system 1400 shown in FIG. 14 is generally similar to system 1300 of FIG. 13 except that the firmware controller 108 is located at the client device 1202 in system 1400 rather than at the imaging device 116 as in system 1300. In the system 1400 of FIG. 14, the imaging job and control data generated by the imaging job generator 102 (steps 802 and 803 of FIG. 8) are sent via communications link 1250 to the client device 1202, where the firmware controller 108 creates a firmware sequence (step 804 of FIG. 8) as generally described above. In executing the firmware sequence (step 806 of FIG. 8), the firmware controller 108 executes stages from the resident firmware 106 by sending over communications link 1250 input to the stage, causing the stage to execute at the imaging device 116, and receiving output from the stage over the communications link 1250.

Figure 15:
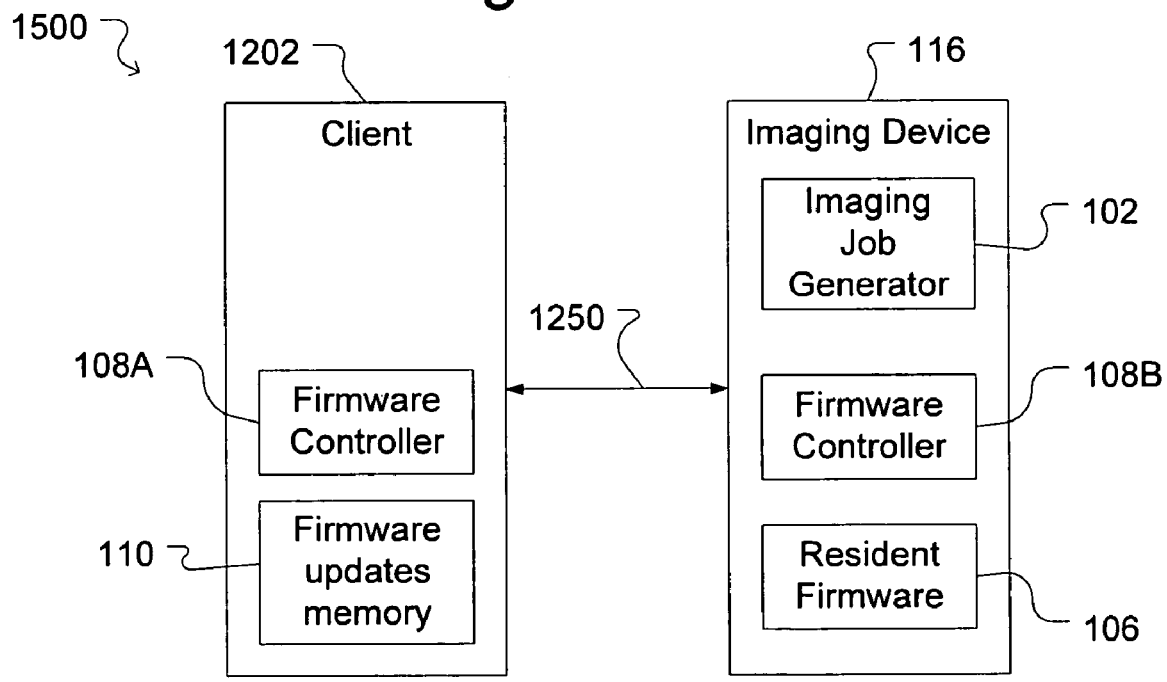

System 1500 of FIG. 15 is generally similar to system 1400 of FIG. 14 except that the firmware controller 108 is distributed between the imaging device 116 and the client device 1202. The imaging device 116 may be a walk up device in which a user initiates the imaging job at the imaging device. For example, the imaging device 116 may be a copy machine or a scanner. In operation, a user initiates generation of an imaging job at step 802 of FIG. 8. For example, the user may place a document page on a copy machine and press the "copy" button. The imaging job is sent via communications link 1250 to client device 1202. Firmware controller 108A at the client device 1202 receives the imaging job and, as part of step 803 of FIG. 8, creates a menu with processing options that correspond to firmware stages in the firmware updates memory 110. Still part of step 803 of FIG. 8, the firmware controller 108A at the client device 1202 sends the menus to the firmware controller 108B at the imaging device 116, which displays the menus to the user. Control data for the imaging job is then generated by firmware controller 108B at the imaging device 116 in accordance with user input through the menus, and the control data is used to create a firmware sequence at step 804 that is executed at step 806 of FIG. 8. Steps 804 and 806 can be executed at the imaging device 116 by firmware controller 108B or at the client device 1202 by firmware controller 108A.

Figure 16:
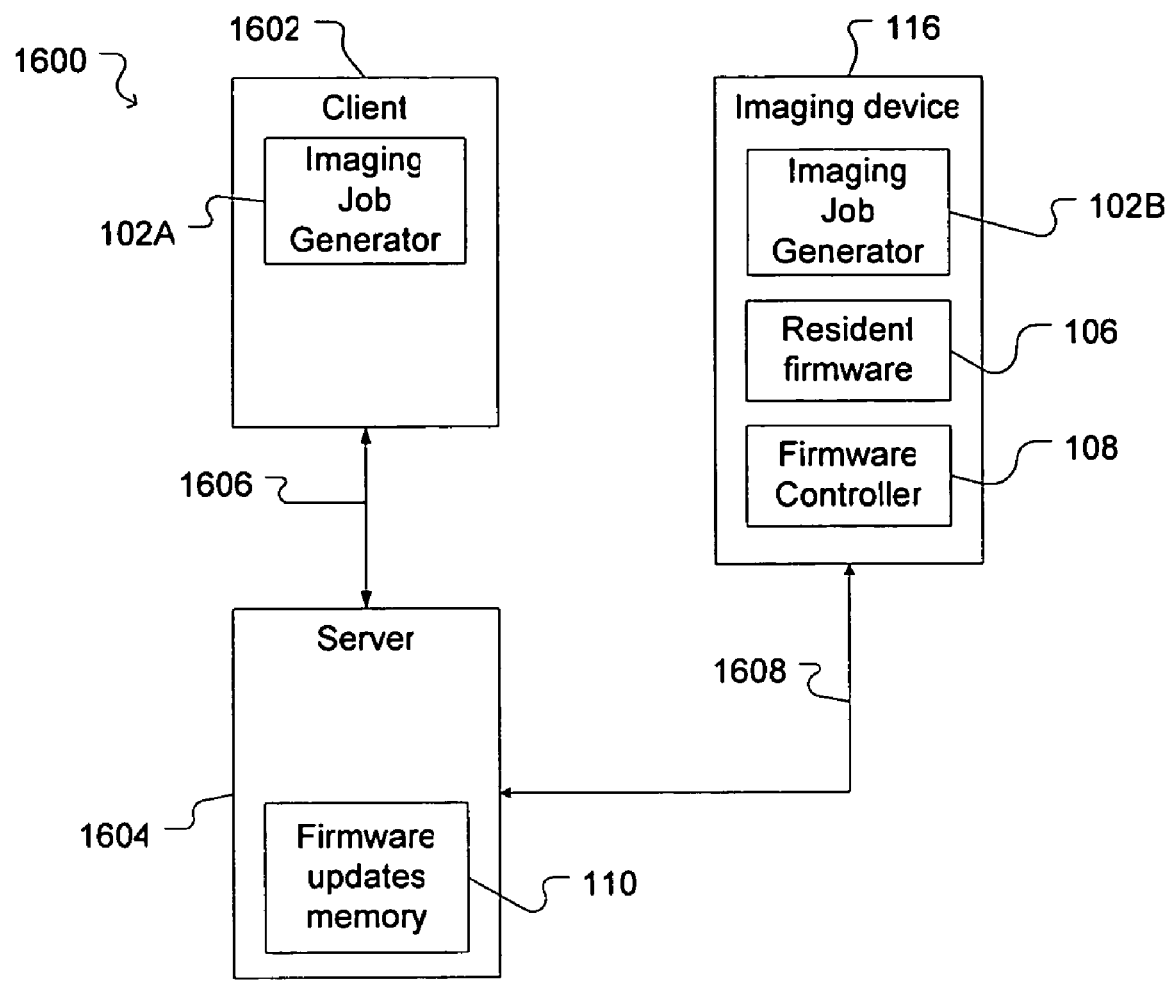
FIGS. 16 and 17 illustrate exemplary imaging systems in which the firmware updates memory is located on a server device.
Figure 17:
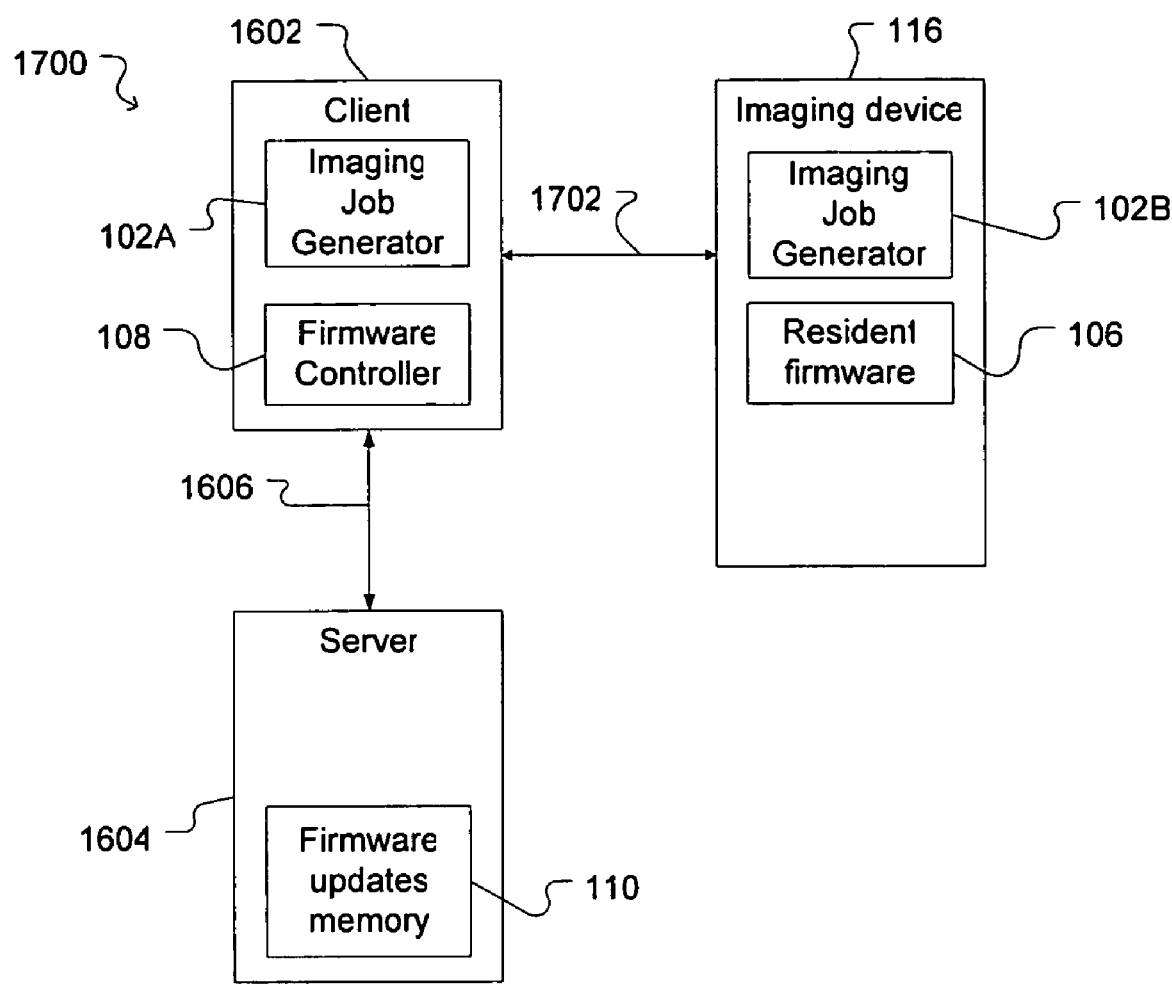

FIGS. 16 and 17 illustrate exemplary imaging systems 1600 and 1700 in which the firmware updates memory 110 is located on a server device 1604.

In the imaging system 1600 of FIG. 16, the imaging job may be generated by an imaging job generator 102A located at the client device 1602 or an imaging job generator 102B located at the imaging device 116. For example, the client device 1602 may be a computer, the server device 1604 may be a facsimile server, and the imaging device 116 may be a facsimile machine. Communications link 1606 connects the client device 1602 to the server device 1604, and communications link 1608 connects the server device 1604 to the imaging device 116.

In accordance with step 1104 of process 1100 shown in FIG. 11 and discussed above, firmware stages stored in the firmware updates memory 110 on the server device 1604 are registered with the imaging device 116 and the client device 1602, and thereafter system 1600 may operate in accordance with process 800 of FIG. 8.

For outgoing facsimile transmissions, the system 1600 may operate as follows: at step 802 of FIG. 8, the imaging job generator 102A generates an imaging job in the form of a document to be sent by facsimile transmission. At step 803 of FIG. 8, the imaging job generator 102A generates control data for the imaging job. Because the firmware stages in firmware updates memory 110 are registered with the imaging job generator 102A, the control data may correspond to special processing options available because of firmware stages stored in the firmware updates memory 110. The imaging job and control data are sent via communications link 1606 to the server device 1604 and via communications link 1608 to the imaging device 116. The server device 1604 may modify the imaging job and thus may modify (e.g., change or add to) the control data to include special processing options available because of firmware stages in the firmware updates memory 110.

At steps 804 and 806 of FIG. 8, the firmware controller 108 processes the imaging job by creating a firmware sequence and processing the imaging job with the firmware sequence, as discussed above with respect to FIGS. 8, 9, and 10. In executing the firmware sequence at step 806, the firmware controller 108 executes stages from the firmware updates memory 110 by sending over communications link 1608 input to the stage, causing the stage to execute at the server device 1604, and receiving output from the stage over the communications link 1608 as described above with respect to FIG. 10. The rendered output (step 808 of FIG. 8) is an outbound transmission of the document from the imaging device 116. The firmware controller 108 may alternatively be located at the server device 1604 or distributed over one or more of the client device 102, the server device 1604, and/or the imaging device 116.

For incoming facsimile transmissions, the system 1600 may operate as follows: at step 802 of FIG. 8, the imaging job generator 102B generates an imaging job in the form of a received transmission. At step 803 of FIG. 8, the imaging job generator 102B generates control data for the imaging job. Because the firmware stages in firmware updates memory 110 are registered with the imaging job generator 102B, the control data may correspond to special processing options available because of firmware stages stored in the firmware updates memory 110.

At steps 804 and 806 of FIG. 8, the firmware controller 108 processes the imaging job by creating a firmware sequence and processing the imaging job with the firmware sequence, as discussed above with respect to FIGS. 8, 9, and 10. In executing the firmware sequence at step 806, the firmware controller 108 executes stages from the firmware updates memory 110 by sending over communications link 1608 input to the stage, causing the stage to execute at the server device 1604, and receiving output from the stage over communications link 1608 as described above with respect to FIG. 10. The rendered output (step 808 of FIG. 8) is the document received as an incoming facsimile transmission at the imaging device 116 constructed into a file with a data format that can be stored, displayed, and manipulated by the client device 1602. The firmware controller 108 may alternatively be located at the server device 1604 or distributed over one or more of the client device 1602, the server device 1604, and/or the imaging device 116. In such a case, prior to processing the imaging job, the firmware controller 108 may send the imaging job to the server device 1604, which may modify the imaging job (e.g., generate control data that corresponds to special processing options available because of the firmware in the firmware updates memory 110, and send the modified imaging job back to the imaging device 116 for processing by the firmware controller 108 at the imaging device 116.

FIG. 17 illustrates an imaging system 1700 that is generally similar to the imaging system 1600 of FIG. 16 except that the server device 1604 does not receive imaging jobs. Rather, imaging jobs generated by the imaging job generator 102A at the client device 1602 are delivered via communications link 1702 directly to the imaging device 116. Similarly, imaging jobs generated by the imaging job generator 102B at the imaging device are delivered via communication link 1702 directly to the client device 1602. In addition, the firmware control 108 in system 1700 is located at the client device 1602. Firmware stages in the firmware updates memory 110 may be executed on the server device 1604 by communicating input data to the firmware stage via communications link 1606 and receiving output from the firmware stage also via communications link 1606, as generally described above with respect to FIG. 10. Alternatively, firmware stages from the firmware updates memory 110 may be executed by downloading via communications link 1606 a copy of the stages to the client device 1602, and executing the copy at the client device 1602. A copy of such downloaded firmware stages may be kept at the client device 1602 for use in processing subsequent imaging jobs, or after using the downloaded firmware stage, the copy may be deleted from the client device 1602. The firmware controller 108 may alternatively be located at the imaging device 116 or distributed across two or more of the server device 1604, client device 1602, and imaging device 116.

Figure 19:
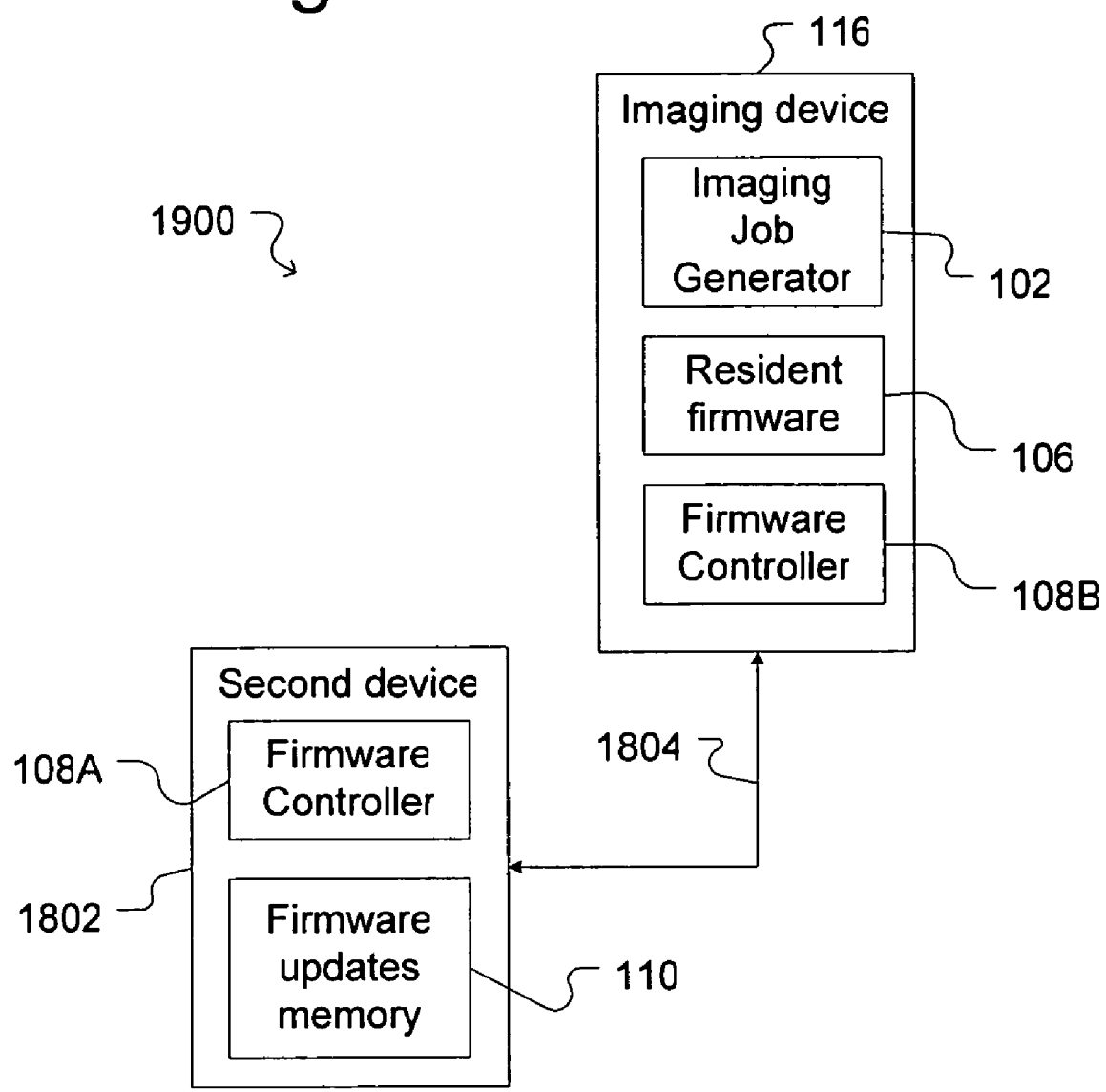

FIGS. 8 and 19 illustrate exemplary imaging systems 1800 and 1900 in which the firmware updates memory 110 is located on a second imaging device 1802.

Figure 18:
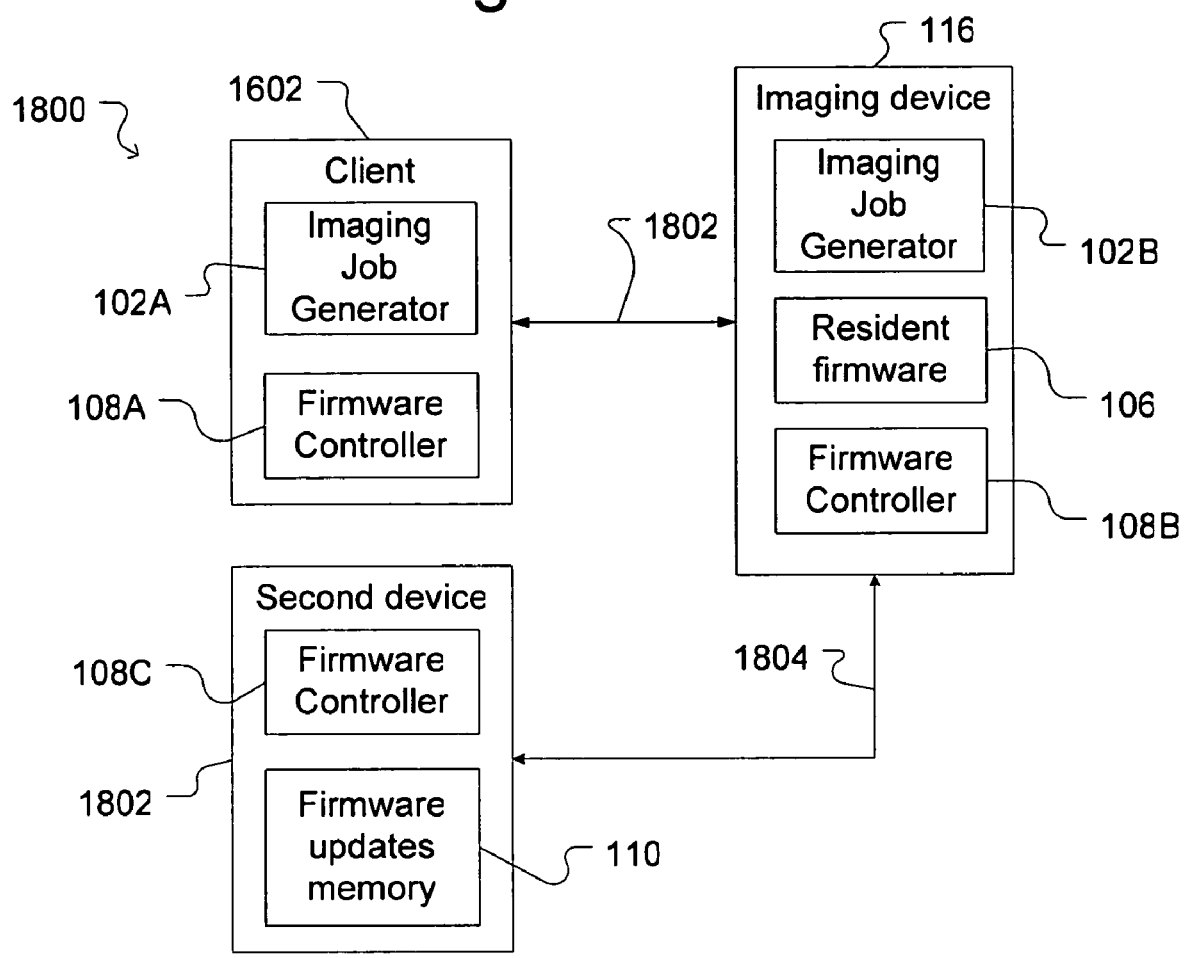
FIGS. 18 and 19 illustrate exemplary imaging systems in which the firmware updates memory is locate on a device that is in communication with the imaging device.

In the imaging system 1800 of FIG. 18, the imaging job may be generated by an imaging job generator 102A located at the client device 1602 or an imaging job generator 102B located at the imaging device 116. For example, the imaging system 1800 of FIG. 18 may be as follows: the client device 1602 may be a computer, and the imaging device 116 may be a facsimile machine. Communications link 1802 connects the client device 1602 to the imaging device 116, and communications link 1804 connects the imaging device 116 to the second device 1802. As shown, the firmware controller 108 may be distributed over the client device 1602, the imaging device 116, and the second device 1802.

In accordance with step 1104 of process 1100 shown in FIG. 11 and discussed above, the firmware controller 108C at the second device 1802 registers firmware stages stored in the firmware updates memory 110 with the imaging device 116 and the client device 1602.

For outgoing facsimile transmissions, the system 1800 may operate as follows: at step 802 of FIG. 8, the imaging job generator 102A generates an imaging job in the form of a document to be sent by facsimile transmission. At step 803 of FIG. 8, the firmware controller 108A at the client device 1602 and/or the imaging job generator 102A generates control data for the imaging job. Because the firmware stages in firmware updates memory 110 are registered with the client device 1602, the control data may correspond to special processing options available because of firmware stages stored in the firmware updates memory 110 at the second device 1802. The imaging job and control data are sent via communications link 1802 to the imaging device 116.

At steps 804 and 806 of FIG. 8, the firmware controller 108B at the imaging device processes the imaging job by creating a firmware sequence and processing the imaging job with the firmware sequence, as discussed above with respect to FIGS. 8, 9, and 10. In executing the firmware sequence at step 806, the firmware controller 108B located at the imaging device 116 executes stages located in the firmware updates memory 110 by sending over communications link 1804 input to the stage, causing the stage to execute at the second device 1802, and receiving output from the stage over the communications link 1804 as described above with respect to FIG. 10. Alternatively, copies of firmware stages from the firmware updates memory 110 may be downloaded to the imaging device 116 via communications link 1804 for execution at the imaging device 116. As yet another alternative, some or all of the firmware stages to be used in the sequence created at step 804 of FIG. 8 can reside on another device (not shown in FIG. 18). The firmware controller 108C can be configured to either download those stages from the other device or initiate remote execution and receive output from those stages over a communications link, such as the Internet or another communications network, (not shown) to the other device (not shown). For example, the control data generated at step 803 of FIG. 8 may include an identifier (e.g., an Internet URL) identifying the location of such firmware stages. The rendered output (step 808 of FIG. 8) is a facsimile transmission of the document by the imaging device 116.

For incoming facsimile transmissions, the system 1800 may operate as follows: at step 802 of FIG. 8, the imaging job generator 102B at the imaging device 116 generates an imaging job in the form of a received transmission. At step 803 of FIG. 8, the imaging job generator 102B and/or the firmware controller 108B at the imaging device 116 generate control data for the imaging job. Because the firmware stages in firmware updates memory 110 are registered with the imaging device 116, the control data may correspond to special processing options available because of firmware stages stored in the firmware updates memory 110.

The firmware controller 108B at the imaging device 116 creates and executes a firmware sequence for processing the imaging job as described above with respect to steps 804 and 806 of FIG. 8 (and FIGS. 9 and 10). Firmware stages in the sequence that are located at the firmware updates memory 110 may be executed at the second device 1802, in the manner discussed above, or those firmware stages may be downloaded to and executed at the imaging device 116, as also discussed above. The rendered output (e.g., the incoming facsimile transmission formatted in a standard document format) is output over communications link 1802 to the client device 1602.

In the imaging system 1900 of FIG. 19, the imaging device 116 includes the imaging job generator 102. The imaging device 116 may be, for example, a copy machine. The system 1900 may operate as follows: in accordance with step 1104 of process 1100 shown in FIG. 11 and discussed above, the firmware controller 108A at the second device 1802 registers firmware stages stored in the firmware updates memory 110 with the imaging device 116. Per step 802 of FIG. 8, an imaging job is generated when a user places a document on the copy machine and presses the "copy" button. As discussed above with respect to system 1500 of FIG. 15, the user may also select processing options that require the use of firmware located in the firmware updates memory 110. Processing options corresponding to firmware in the firmware updates memory 110 may be presented to the user via a menu of processing options. If the user selects such an option, the control data generated at step 803 of FIG. 8 identifies such selected processing options.

The firmware controller 108B at the imaging device then creates a firmware sequence and processes the imaging job with the firmware sequence as discussed above with respect to steps 804 and 806 of FIG. 8 (and FIGS. 9 and 10). Firmware stages in the sequence that are located at the firmware updates memory 110 may be executed at the second device 1802, in the manner discussed above, or those firmware stages may be downloaded to and executed at the imaging device 116, as also discussed above. The rendered output (e.g., the printing of a copy of the document) is output from the imaging device 116.

Figure 20:
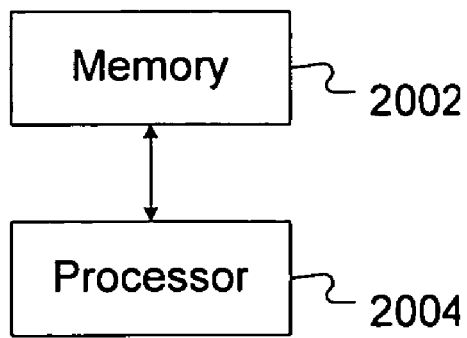
FIG. 20 illustrates an exemplary system for implementing the firmware controller of the systems of FIGS. 2 and 12-19.

FIG. 20 illustrates a simplified block diagram of an exemplary implementation of the firmware controller 108. As shown, the firmware controller 108 may be implemented in software stored in a digital memory 2002 (e.g., a semiconductor based memory, a magnetic based memory, an optical based memory, etc.) and executed on a digital processor 2004. The firmware controller 108 may alternatively be implemented in software stored in a plurality of digital memories 2002 and executed on a plurality of digital processors 2004. As yet another alternative, the firmware controller 108 may be implemented in logic circuits (not shown) or in a combination of logic circuits and software operating on a processor 2004 or processors.

Figure 21:
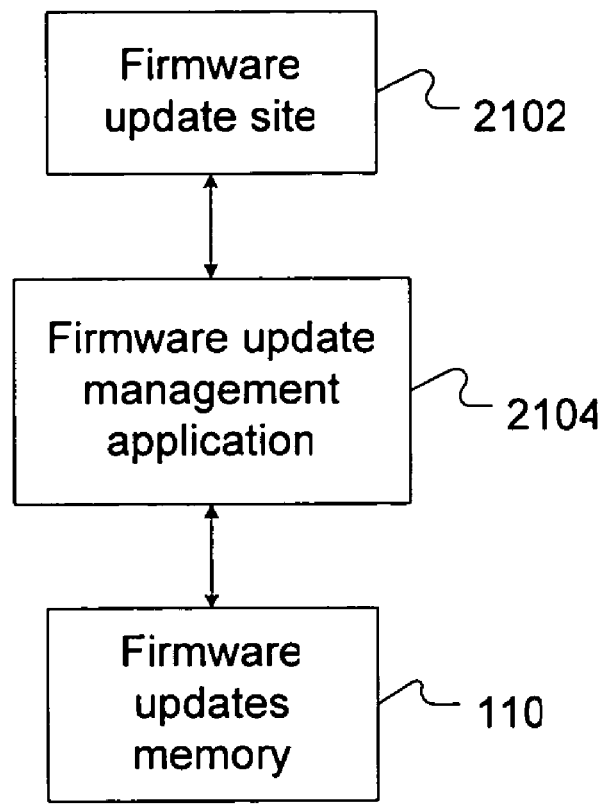
FIG. 21 illustrates an exemplary system in which firmware updates are downloaded to the firmware updates memory 110 of the systems of FIGS. 2 and 12-19.

FIG. 21 illustrates an exemplary system in which newly created or available firmware updates are stored at a firmware update site 2102, which may be, for example, a web site. A firmware update management application program 2104 manages download of such firmware updates in the form of firmware stages (e.g., stage A 302, stage B 304 of FIG. 4) from the update site 2102 to the firmware updates memory 110. For example, the firmware update management application 2104 may be included in any of the imaging systems discussed above (e.g., 100, 1200, 1300, 1400, 1500, 1600, 1700, 1800, 1900). The firmware update management application 2104 may be configured automatically to check periodically the firmware update site 2102 for newly available firmware. The firmware update management application 2104 may be configured alternatively or in addition to respond to notices from the firmware update site 2102 that new firmware stages are available. Upon download of new firmware stages to the firmware updates memory 110, the firmware update management application 2004 may be configured to initiate execution of process 1100 of FIG. 11 to register the new firmware.

Although specific embodiments and applications of the invention have been described in this specification, there is no intention that the invention be limited these exemplary embodiments and applications or to the manner in which the exemplary embodiments and applications operate or are described herein. For example, although the firmware update memory 110 is shown herein as residing on a single device, the firmware update memory 110 may be distributed over more than one device. For example, the firmware updates memory 110 may be located on both the client device 1602 and the second device 1802 in system 1800 of FIG. 18. Thus, the non-resident firmware stages in a firmware sequence can be located on and run on different devices. For example, in the firmware sequence 500 shown in FIG. 5, stage A 302 can be located and run on the client device 1602 and stage B 304 can be located and run on the second device 1802 of FIG. 18. As another example, of a change that can be made to the exemplary embodiments discussed herein, the firmware stages from the firmware updates memory 110 may be executed in a different operating environment than the operating environment of the resident firmware 106. For example, firmware stages from the firmware updates memory 110 may be downloaded to the imaging device 116 and executed within a Java Virtual Machine. As yet another example, although stage 1 202 is not replaced in the exemplary firmware sequences 500, 600, and 700 of FIGS. 5, 6, and 7, stage 1 202 could be replaced by a stage (e.g., 302, 304) from the firmware updates memory 110. As still another example, the host device 118 may be resident in but nevertheless independent of the imaging device 116. For example, the host device 118 may be running as a guest operating system (e.g., Java) on the imaging device 116.

What is claimed is:
1. An imaging system comprising:
an imaging device comprising a plurality of firmware components and configured to use the firmware components to process an imaging job into rendered output using a plurality of sequential firmware components, each firmware component being configured to execute a portion of processing of said imaging job;
a host device comprising an additional firmware component; and
controller means configured to modify rendering capabilities of the imaging device by downloading the additional firmware component to the imaging device and creating a custom sequence of firmware components at the imaging device by reordering execution of said plurality of sequential firmware components of said imaging device while including said additional firmware component of said host device in said custom sequence, the custom sequence to be used in rendering said imaging job into said rendered output by:
providing imaging data from the imaging job as input to a first component of the custom sequence of firmware components;
receiving processed output from the first component of the custom sequence of firmware components; and
repeating, until all components of the custom sequence of firmware components have been executed, the following steps:
determining whether all components of the custom sequence of firmware components have been executed;

when not all components of the custom sequence of firmware components have been executed, setting a next component in the custom sequence of firmware components as the current component;

providing imaging data received as processed output from the most recently-executed component as input to the current component; and receiving processed output from the current component.

2. The imaging system of claim 1, wherein said controller means interleaves said additional firmware component between two of said firmware components of said imaging device.

3. The imaging system of claim 1, wherein said controller means replaces one of said firmware components of said imaging device with said additional firmware component.

4. The imaging system of claim 1, wherein:

said sequential firmware components of said imaging device comprise a first firmware component, a last firmware component, and at least one middle firmware component, and said controller means replaces one of said at least one middle firmware component with said additional firmware component.

5. The imaging system of claim 1, wherein each of said firmware components of said imaging device and said additional firmware component are configured to have compatible input/output interfaces such that a format of output from any of said firmware components of said imaging device and said additional firmware component is compatible with a format for input to any of said firmware component of said imaging device and said additional firmware component.

6. The imaging system of claim 1, wherein said host device comprises a plurality of said additional firmware components, said imaging system further comprising creating means for combining at least one of said firmware components of said imaging device with at least one of said additional firmware components of said host to dynamically create said sequence of firmware components by which said controller means renders said imaging job into said rendered output.

7. The imaging system of claim 6, wherein said creating means combines said at least one of said firmware components of said imaging device and said at least one of said additional firmware components of said host in accordance with control data associated with said imaging job.

8. The imaging system of claim 7, wherein said control data identifies at least one processing option for said imaging job.

9. The imaging system of claim 6 further comprising setting means for setting said sequence of firmware components created by said creating means as a default process for rendering subsequent imaging jobs.

10. A method of rendering image data, said method comprising:

receiving image data to be rendered by an imaging device, wherein said imaging device comprises resident firmware for rendering said image data into rendered output and said resident firmware is organized into a plurality of firmware components, each being configured to execute a portion of processing of imaging jobs;

creating modified firmware for rendering said image data into said rendered output by downloading at least one additional firmware component to said imaging device, reordering said plurality of firmware components of said resident firmware, and combining said at least one additional firmware component from a host device with said resident firmware at said imaging device; and rendering said image data into said rendered output using said modified firmware, comprising:

providing imaging data from the imaging job as input to a first stage of the modified firmware;

receiving processed output from the first stage of the modified firmware; and repeating, until all stages of the modified firmware have been executed, the following steps:

determining whether all stages of the modified firmware have been executed;

when not all stages of the modified firmware have been executed, setting a next stage in the modified firmware as the current stage;

providing imaging data received as processed output from the most recently-executed stage as input to the current stage; and receiving processed output from the current stage.

11. The method of claim 10, wherein said modified firmware comprises said additional firmware component interleaved with said firmware components of said resident firmware.

12. The method of claim 10, wherein said modified firmware comprises said resident firmware modified by replacing one of said firmware components with said additional firmware component.

13. The method of claim 10, wherein each of said firmware components of said imaging device and said additional firmware component are configured to have compatible input/output interfaces such that a format of output from any of said firmware components of said imaging device and said additional firmware components is compatible with a format for input to any of said firmware components of said imaging device and said additional firmware component.

14. The method of claim 10 further comprising receiving control data identifying at least one processing option for said image data.

15. The method of claim 14, wherein said modified firmware implements said processing option, which processing option is an addition to one or more processing options provided by said resident firmware.

16. The method of claim 10, wherein said rendering step comprises:

receiving said image data as input of a first component of said modified firmware;

executing said first component of said modified firmware to generate output of said first component comprising said image data processed by said first component;

passing said output of said first component to a second component of said modified firmware as input of said second component;

executing said second component of said modified firmware to generate output of said second component comprising said image data processed by said first and second components; and repeatedly passing image data as processed by each component to additional components and executing said additional components until said modified firmware has been executed in full and said image data has been rendered into said rendered output.

17. The method of claim 16, wherein said steps of creating and rendering are combined such that a dynamic determination is made after execution of each firmware component of a next firmware component to be utilized in said step of rendering, thereby leading to creation of said modified firmware.

18. The method of claim 17, wherein said dynamic determination of each next firmware component is based on results of execution of each firmware component prior to each next firmware component.

19. The method of claim 10, wherein said plurality of firmware components of said resident firmware comprise a first firmware component and a last firmware component, and said at least one firmware component from said host device modifies rendering by said resident firmware between said first firmware component and said last firmware component.

20. A non-transitory computer readable storage medium storing computer readable codes to perform a method, wherein said method comprises:
   receiving control data associated with an imaging job to be rendered by an imaging device, wherein said imaging device comprises resident firmware for rendering said image job into rendered output and said resident firmware is organized into a plurality of firmware components to be executed in a default sequence to render said imaging job;
   creating modified firmware for rendering said image job into said rendered output by downloading at least one additional firmware component to said imaging device and creating a modified sequence of firmware components that is different than said default sequence and that includes said at least one additional firmware component by reordering said firmware components of said resident firmware into a sequence different from said default sequence and by combining said at least one additional firmware component into said modified sequence; and
   rendering said image job into said rendered output using said modified firmware, comprising:
      providing imaging data from the imaging job as input to a first stage of the modified firmware;
      receiving processed output from the first stage of the modified firmware; and
      repeating, until all stages of the modified firmware have been executed, the following steps:
         determining whether all stages of the modified firmware have been executed;
         when not all stages of the modified firmware have been executed, setting a next stage in the modified firmware as the current stage;
         providing imaging data received as processed output from the most recently-executed stage as input to the current stage; and
         receiving processed output from the current stage.

21. The computer readable medium of claim 20, wherein said modified firmware comprises said additional firmware component interleaved with firmware components of said resident firmware.

22. The computer readable medium of claim 20, wherein said modified firmware comprises said resident firmware modified by replacing one of said firmware components with said additional firmware component.

23. The computer readable medium of claim 20, wherein each of said firmware components of said imaging device and said additional firmware component are configured to have compatible input/output interfaces such that a format of output from any of said firmware components is compatible with a format for input to any of said firmware components.

24. The computer readable medium of claim 23, wherein said plurality of firmware components comprises a firmware component configured to translate data into a format compatible with the input/output interfaces such that a firmware component having a non-compatible interface may be used in said modified firmware.

25. The computer readable medium of claim 20, wherein said control data identifies at least one processing option for said image job.

26. The computer readable medium of claim 25, wherein said modified firmware implements said processing option.

* * * * *